United States Patent [19]

Bourel et al.

[11] Patent Number: 5,980,310
[45] Date of Patent: Nov. 9, 1999

[54] POWER SUPPLY UNIT FOR PORTABLE APPARATUS AND OF THE TYPE ENABLING VARIOUS TYPES OF POWER SOURCE TO BE USED, AND CORRESPONDING PORTABLE APPARATUS

[75] Inventors: Christian Bourel, Taverny; Robert Bertrand, Morsang-sur-Orge, both of France

[73] Assignee: Alcatel, Paris, France

[21] Appl. No.: 09/020,336

[22] Filed: Feb. 9, 1998

[30] Foreign Application Priority Data

Feb. 10, 1997 [FR] France .................................. 97 01478

[51] Int. Cl.$^6$ .............................. H01R 29/00; H01R 3/00; H01M 2/10
[52] U.S. Cl. ................................ 439/500; 439/53; 429/96
[58] Field of Search ........................... 439/52–3, 97–100, 439/500, 516, 568, 862, 49–51, 217–18; 429/96–100; 320/2

[56] References Cited

U.S. PATENT DOCUMENTS

| | | | |
|---|---|---|---|
| 5,015,546 | 5/1991 | Dulaney et al. | |
| 5,395,263 | 3/1995 | Sandell | 439/500 |
| 5,607,322 | 3/1997 | Schaub | 439/500 |
| 5,661,392 | 8/1997 | Imazeki | 320/2 |
| 5,834,919 | 11/1998 | Liu | 320/2 |

FOREIGN PATENT DOCUMENTS

0712226A1  5/1996  European Pat. Off. .

*Primary Examiner*—Lincoln Donovan
*Attorney, Agent, or Firm*—Sughrue, Mion, Zinn, Macpeak & Seas, PLLC

[57] ABSTRACT

A power supply unit for portable apparatus. The battery of rechargeable cells is provided with a connector designed to co-operate with a first connector when said battery of rechargeable cells is placed in said cavity. The power supply unit further includes a removable part serving as an electrical interface between said set of at least one non-rechargeable cell and the first connector, when the set of at least one non-rechargeable cell is placed in the cavity, the removable part being provided with another connector designed to co-operate with said first connector. According to the invention, the removable part can take up the following two positions inside said cavity: a passive position when the battery of rechargeable cells is placed in the cavity, in which position the part does not serve as an electrical interface relative to said first connector; and an active position when the set of at least one non-rechargeable cell is placed in the cavity, in which position the part serves as an electrical interface between said set of at least one non-rechargeable cell and said first connector.

9 Claims, 3 Drawing Sheets

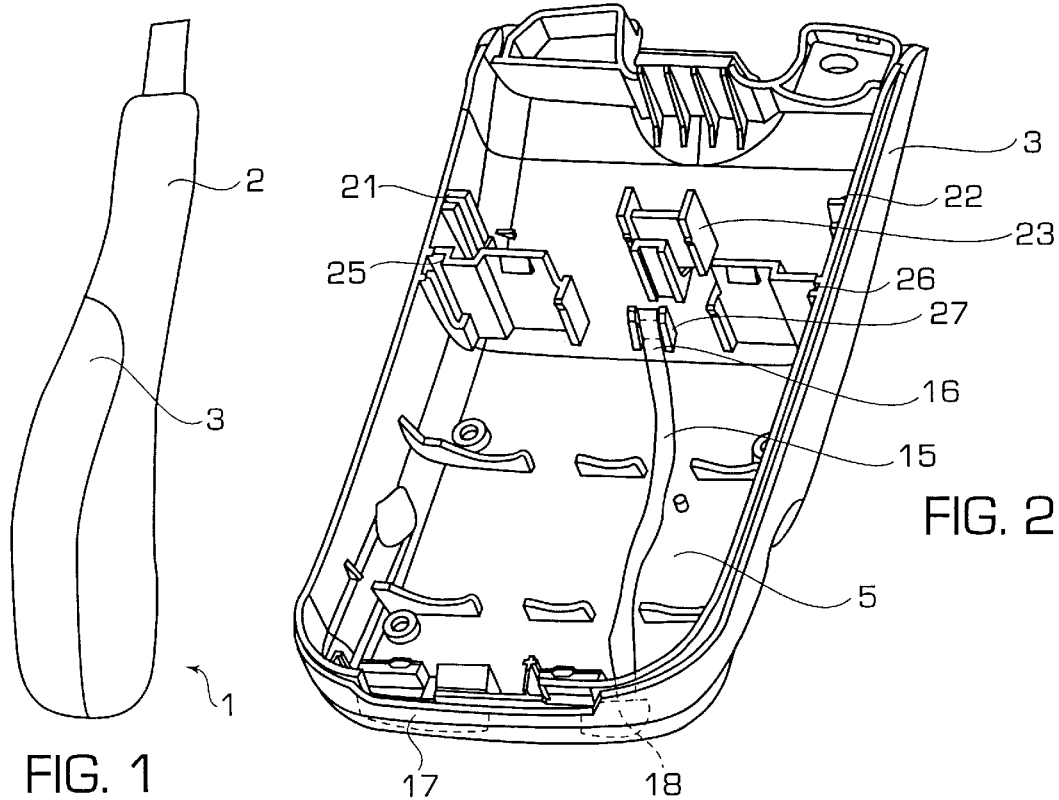
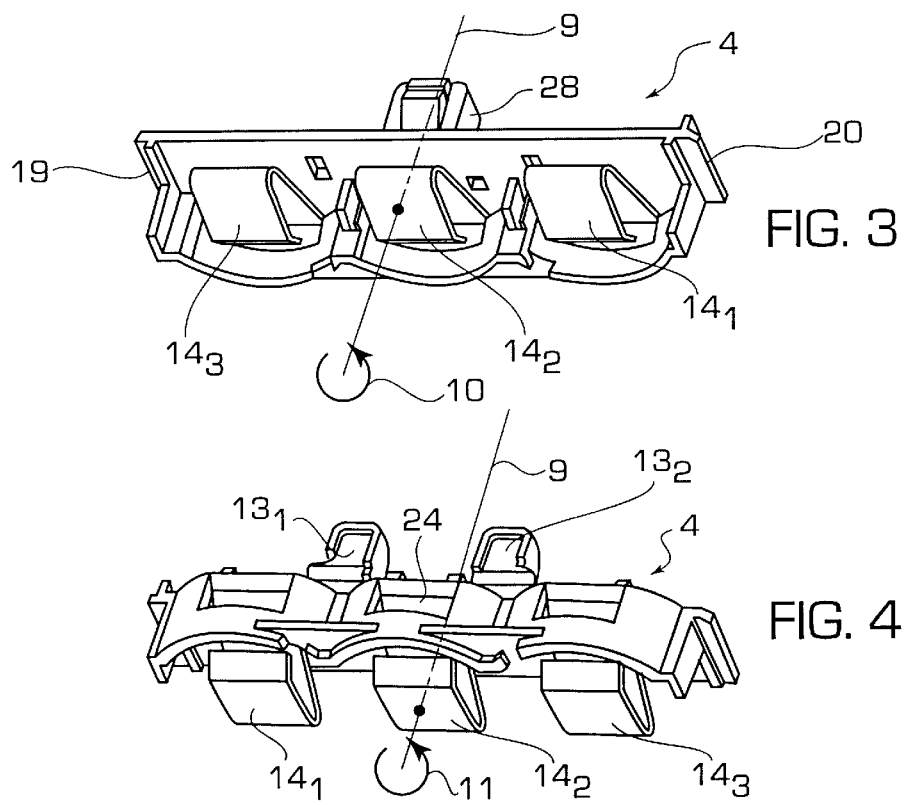
FIG. 1
FIG. 2
FIG. 3
FIG. 4 ns5,980,310

POWER SUPPLY UNIT FOR PORTABLE APPARATUS AND OF THE TYPE ENABLING VARIOUS TYPES OF POWER SOURCE TO BE USED, AND CORRESPONDING PORTABLE APPARATUS

FIELD OF THE INVENTION

The invention relates to electrical power supplies for portable apparatus. The term "portable apparatus" is used particularly but not exclusively to designate radiocommunications terminals (e.g. terminals of the GSM type).

The invention relates more precisely to a power supply unit (or housing, or fairing) of the type designed to be removably mounted on the body of portable apparatus. In other words, the invention relates to the (removable) portion of the portable apparatus that contains the electrical power source.

BACKGROUND OF THE INVENTION

Various types of power supply unit are known in the state of the art.

In the simplest case, the power supply unit includes a cavity in which a battery of rechargeable cells is placed in fixed manner. Such a battery of rechargeable cells is generally referred to as a "rechargeable battery pack" or as a "soft pack". The body of the apparatus includes a first power supply connector, and the battery of rechargeable cells includes a second connector. When the power supply unit is mounted on the body of the apparatus, the first and second connectors co-operate together so that the body of the apparatus (which contains in particular the transmit/receive means when the apparatus is a radiocommunications terminal) is powered by the battery.

When the battery is discharged, the user has two options. If the user does not need the portable apparatus immediately, the power supply unit can be left on the body of the apparatus, and the resulting assembly can be placed on a support for charging it via tabs provided for this purpose on the body of the portable apparatus (in general on its bottom end). In which case, the battery is recharged via the body of the portable apparatus However, if the user does need the portable apparatus immediately, a new power supply unit whose battery is charged can be put in place. The battery of the replaced power supply unit can then be recharged directly by means of suitable charging equipment (instead of via the portable apparatus).

The major drawback with the above-mentioned solution is that it can be impossible for the user to use the portable apparatus. If the user has only one battery, and if that battery is discharged, then it is necessary to wait for the battery to be recharged before the portable apparatus can be used again. Furthermore, if the user has more than one battery, it is possible that, through inadvertence, all of them might be discharged at the same time. For example, this applies when the user puts a new power supply unit in place and then forgets to recharge the battery of the replaced unit.

In order to avoid such a situation which is very inconvenient for the user, a second type of power supply unit has been proposed. The principle of it is that the power supply unit can receive two types of power source, namely either a battery of rechargeable cells (which is then no longer fixed permanently in the cavity of the power supply unit), or a set of non-rechargeable cells. Thus, when no charged battery is available, it is possible for the user to use standard non-rechargeable cells instead of the battery of rechargeable cells. In general, a battery of rechargeable cells is replaced by three standard AA-type non-rechargeable cells. Since such non-rechargeable cells are readily available from a large number of shops, the user has operational apparatus available at all times.

As explained above, to enable the apparatus to be powered by the battery of rechargeable cells, it includes a second connector designed to co-operate with the first connector on the body of the portable apparatus. Therefore, when a set of non-rechargeable cells is used, it is also necessary to have available a connector serving as an electrical interface between the set of non-rechargeable cells and the first connector of the body of the portable apparatus.

The currently proposed solution consists in providing a removable additional part serving as said electrical interface between the set of non-rechargeable cells and the first connector of the body of the portable apparatus. The removable part includes a third connector designed to co-operate with the first connector.

In the current state of the art, the removable additional part is in the form of an independent housing made of plastic and that the user places in the power supply unit only when the set of non-rechargeable cells is to be used.

That solution is not very satisfactory because it means that the user must remember to keep the additional part on hand at all times. There is therefore a high probability that the part will not be on hand when the user actually needs it.

In addition, in its current form, the additional part has dimensions such that it can receive only small non-rechargeable cells. As a result, the length of operating time of the portable apparatus is reduced when non-rechargeable cells are used.

OBJECTS AND SUMMARY OF THE INVENTION

A particular object of the invention is to mitigate the various drawbacks of the state of the art.

More precisely, one of the objects of the present invention is to provide a power supply unit for portable apparatus and of the type making it possible to use different power sources (namely in particular a battery of rechargeable cells and a set of non-rechargeable cells), and which does not require the user to store an additional part.

Another object of the invention is to provide such a power supply unit that makes it possible to increase the length of operating time of the portable apparatus with the set of non-rechargeable cells.

Another object of the invention is to provide an additional part whose cost and complexity are reduced compared with known additional parts (as mentioned above).

An additional object of the invention is to provide such a power supply unit that can be used very easily with a set of standard non-rechargeable cells.

The various above-mentioned objects and others that appear below are achieved by the invention by means of a power supply unit for portable apparatus, the unit being of the type designed to be removably mounted on the body of said portable apparatus, said body being provided with a first power supply connector, said power supply unit being provided with a cavity that is suitable for receiving two types of power source, namely either a battery of rechargeable cells or a set of at least one non-rechargeable cell;

said battery of rechargeable cells being provided with a second connector designed to co-operate with said first connector when said battery of rechargeable cells is placed in said cavity;

said power supply unit further including a removable part serving as an electrical interface between said set of at least one non-rechargeable cell and said first connector, when said set of at least one non-rechargeable cell is placed in said cavity, said removable part being provided with a third connector designed to co-operate with said first connector;

wherein said removable part can take up the following two positions inside said cavity:

a passive position when the battery of rechargeable cells is placed in the cavity, in which position the part does not serve as an electrical interface relative to said first connector; and an active position when the set of at least one non-rechargeable cell is placed in the cavity, in which position the part serves as an electrical interface between said set of at least one non-rechargeable cell and said first connector.

The general principle of the invention thus consists in having the removable part permanently in the cavity of the power supply unit, and not only when the set of non-rechargeable cells is used. Thus, the user is sure to have the removable part available at all times because, even when the battery of rechargeable cells is being used, the removable part is stored in the cavity of the power supply unit (without it then performing any electrical interface function).

Advantageously, said set of at least one non-rechargeable cell has an overall size that is substantially identical to the overall size of said battery of rechargeable cells.

Thus, by making it possible to use non-rechargeable cells of the same size as the cells of the battery of rechargeable cells, the length of operating time of the portable apparatus is optimized when the apparatus is used with the set of non-rechargeable cells.

Advantageously, said removable part is provided with mechanical holding means for holding said battery of rechargeable cells in said cavity when said part is in said passive position.

Thus, when in the passive position, the removable part is "passive" only electrically because it is "active" mechanically in that it contributes to holding the battery of rechargeable cells stationary in the cavity of the power supply unit.

Preferably, said mechanical holding means comprise at least one spring-forming blade that:

presses against said battery of rechargeable cells when said removable part is in said passive position; and provides electrical contact with a pole of a non-rechargeable cell of said set when said removable part is in the active position.

Thus, at least one element of the removable part (namely a blade) performs two functions, namely an electrical contact function (removable part in the active position), and a mechanical holding function (removable part in the passive position).

Preferably, said removable part has a width less than or equal to the width of said cavity, and the wall of said cavity is provided with:

a first pair of side grooves placed on either side of the cavity and in which the ends of said removable part can slide when said part is placed in said passive position; and first snap-fastening means placed substantially midway between the two sides of the cavity and serving, when said part is placed in said active position, to cooperate with second snap-fastening means provided on said removable part substantially at the center thereof.

Advantageously, said removable part has a width less than or equal to the width of said cavity, and the wall of said cavity is provided with:

a second pair of side grooves placed on either side of the cavity, and in which the ends of said removable part can slide when said part is placed in said active position; and third snap-fastening means placed substantially midway between the two sides of the cavity, and serving, when said part is placed in said active position, to cooperate with fourth snap-fastening means provided on said removable part substantially at its center.

Advantageously, if said set comprises at least two non-rechargeable cells, said third and fourth snap-fastening means also co-operate to provide an electrical link contributing to the electrical link between the non-rechargeable cells.

The invention further provides portable apparatus including a power supply unit as defined above, the apparatus being constituted, in particular, by a portable radiocommunications terminal.

BRIEF DESCRIPTION OF THE DRAWINGS

Other characteristics and advantages of the invention appear on reading the following description of a preferred embodiment of the invention given by way of non-limiting example and with reference to the accompanying drawings, in which:

FIG. 1 is a side view of an example of a radiocommunications terminal, with its power supply unit;

FIG. 2 is a perspective view of a particular embodiment of a power supply unit of the invention, without the removable part;

FIG. 3 is a perspective view of a particular embodiment of the removable part of the invention, as angularly positioned in the passive position;

FIG. 4 is a perspective view of a particular embodiment of the removable part of the invention, as angularly positioned in the active position;

MORE DETAILED DESCRIPTION

The invention thus relates to a power supply unit of portable apparatus, it being possible for the power supply unit to receive two types of power sources, namely either a battery of rechargeable cells or a set of non-rechargeable cells.

The portable apparatus described below is a radiocommunications terminal generally more simply referred to as a "portable telephone". For example, it may be a GSM-type cellphone. Clearly, the invention may be applied to any type of portable apparatus containing a power supply unit.

As shown in FIG. 1, and in conventional manner, a portable telephone 1 includes a body 2 on which a power supply unit 3 is removably mounted. It should be noted that the power supply unit 3 is sometimes referred to as a power supply "fairing" or a power supply "housing".

Also in conventional manner, in order to receive the electrical energy delivered by the power supply unit 3, the body 2 includes a first power supply connector (not shown)

which is designed to co-operate with another connector provided for this purpose in the power supply unit 3. As explained below, in the context of the invention, this other connector provided in the power supply unit is either the connector provided on the battery of rechargeable cells (referred to as the "second" connector) or else the connector provided on the removable part (referred to as the "third" connector).

Figure 6:
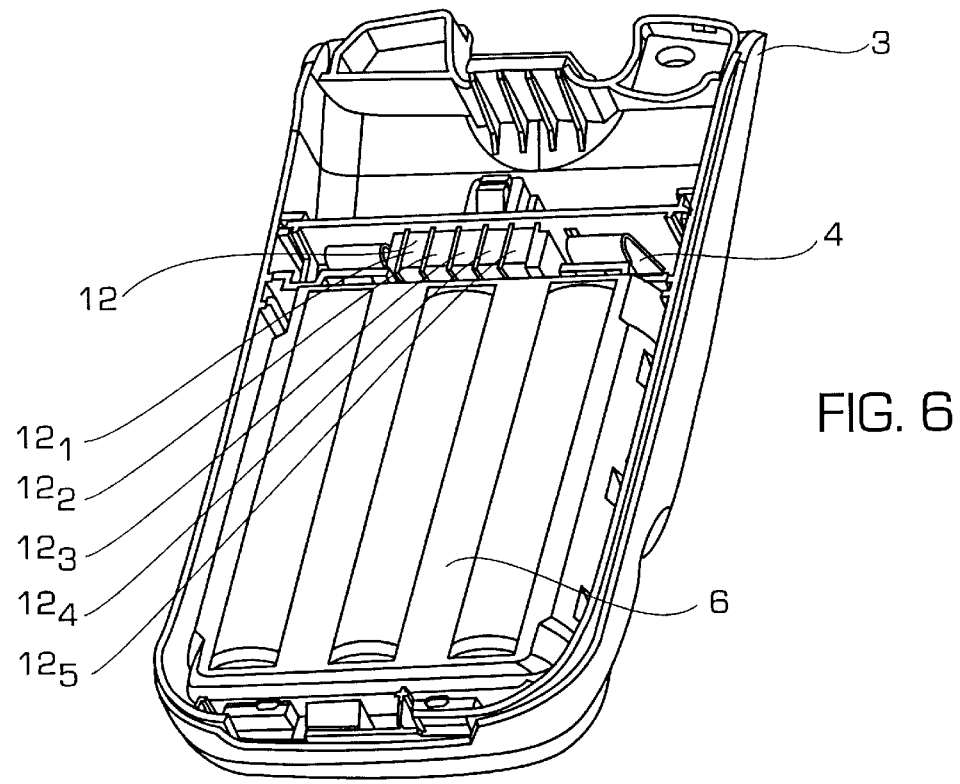
FIG. 6 reproduces FIG. 5 with the battery of rechargeable cells in place.

FIG. 2 is a perspective view of a particular embodiment of the power supply unit 3 of the invention, without the removable part 4 (which is shown separately in FIGS. 3 and 4). The power supply unit 3 is provided with a cavity 5 serving to receive either the battery of rechargeable cells 6 (cf FIG. 6) or the set of non-rechargeable cells (cf FIG. 8).

According to the invention, the power supply unit 3 is further provided with a removable part 4 which remains in the above-mentioned cavity 5 permanently. For this purpose, the removable part 4 may take up either one of the following two positions:

a passive position, when the battery of rechargeable cells 6 is placed in the cavity 5; and an active position, when the set of non-rechargeable cells 7 is placed in the cavity 5.

In the passive position, the removable part 4 does not serve as an electrical interface relative to the first connector of the body 2. The passive position is shown in FIG. 3 (in which the removable part is shown alone), in FIG. 5 (in which the removable part is shown as installed in the cavity 5 of the power supply unit 3) and in FIG. 6 (which differs from FIG. 5 in that the battery of rechargeable cells 6 is also installed).

When the battery of rechargeable cells 6 is used (i.e. when the removable part 4 is in the passive position), it is the second connector 12 provided on the battery of rechargeable cells 6 (cf FIG. 6) that cooperates with the first connector (not shown) of the body 2. The second connector 12 is provided with five tabs $12_1$ to $12_5$, namely two end tabs $12_1$, $12_5$ for powering the body 2, and three central tabs $12_2$ to $12_4$ used for temperature control while recharging the battery 6.

In the active position, the removable part 4 serves as an electrical interface between the set of non-rechargeable cells 7 and the first connector of the body 2. The active position is shown in FIG. 4 (in which the removable part is shown alone), in FIG. 7 (in which the removable part is shown as installed in the cavity 5 of the power supply unit 3), and in FIG. 8 (which differs from FIG. 7 in that the non-rechargeable cells 7 are also installed).

When the non-rechargeable cells 7 are used (i.e. when the removable part 4 is in the active position), it is the third connector 13 provided on the removable part (cf FIGS. 7 and 8) that co-operates with the first connector (not shown) of the body 2. The third connector 13 is provided with two tabs $13_1$ and $13_2$ only, namely those corresponding to the two end tabs $12_1$ and $12_5$ of the second connector 12 of the battery of rechargeable cells 6 (which end tabs are used for powering the body 2).

The removable part 4 is provided with blades $14_1$ to $14_3$, each of which serves to provide electrical contact with a pole of a respective non-rechargeable cell 7 when the removable part 4 is in the active position. Each of the two end tabs $13_1$ and $13_5$ is connected to a respective one of the two end contact blades $14_1$ and $14_3$. In addition, when the removable part is placed in the active position, the central contact blade $14_2$ comes into contact via a stud 16 (cf FIG. 2) with a conductive strip 15 implemented at the back of the cavity 5.

Figure 7:
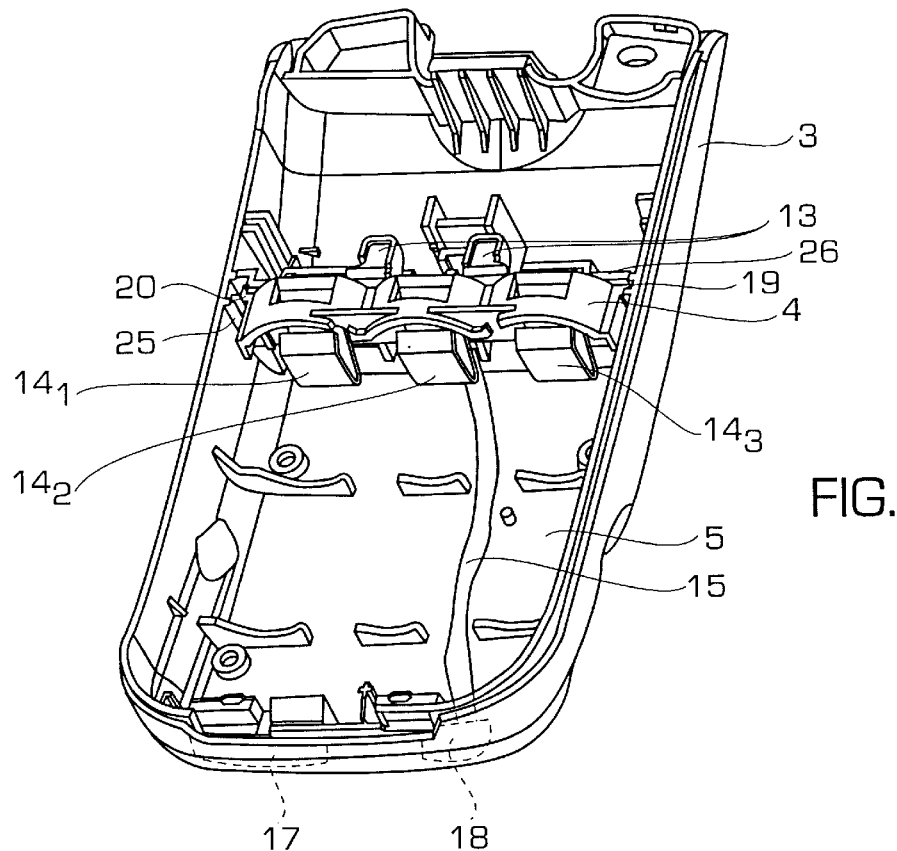
FIG. 7 shows the FIG. 2 power supply unit with the removable part in the active position (as shown in FIG. 4)
Figure 8:
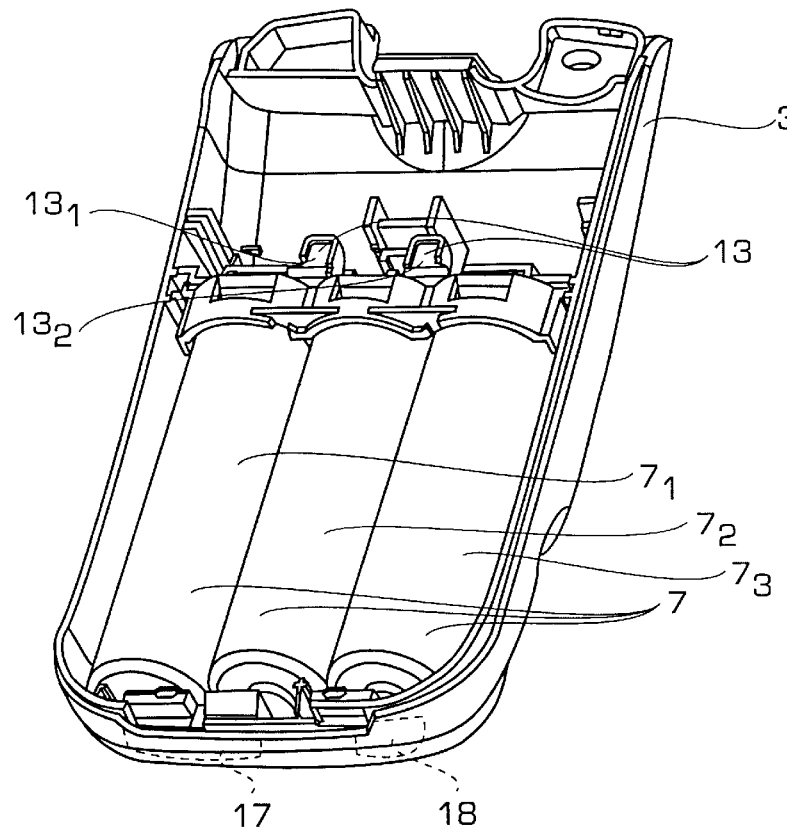
FIG. 8 reproduces FIG. 7 with the set of non-rechargeable cells in place.

Finally, the bottom of the cavity 5 is provided with two conductive plates 17, 18 (shown in dashed lines in FIGS. 2, 7, and 8 because they are inside the cavity, and therefore not normally visible in these figures).

Thus, in the example shown, the three non-rechargeable cells $7_1$ to $7_3$ are connected in series to the two end tabs $13_1$ and $13_2$ as follows:

the left end tab $13_1$ is in contact with the + pole of the first non-rechargeable cell $7_1$ via the left contact blade $14_1$;

the − pole of the first non-rechargeable cell $7_1$ is in contact with the + pole of the second non-rechargeable cell $7_2$ via the left conductive plate 17;

the − pole of the second non-rechargeable cell $7_2$ is in contact with the + pole of the third non-rechargeable cell $7_3$ via successively the central contact blade $14_2$, the conductive strip 15, and the right conductive plate 18; and the − pole of the third non-rechargeable cell $7_3$ is in contact with the right end tab $13_2$ via the right contact blade $14_3$.

As shown clearly in the figures (in particular in FIGS. 3 and 4), in the embodiment shown, to go between the active position and the passive position, the removable part 4 is merely turned over. In other words it is rotated through 180° about an axis 9 perpendicular to its main plane. To go from the passive position (cf FIG. 3) to the active position (cf FIG. 4), the rotation is referenced 10 in FIG. 3. Conversely, to go from the active position (cf FIG. 4) to the passive position (cf FIG. 3), the rotation is referenced 11 in FIG. 4.

The set of non-rechargeable cells 7 is constituted in this example by three standard AA-type non-rechargeable cells. Each non-rechargeable cell is the same size as one of the cells of the battery of rechargeable cells 6. It is important to note that the set of non-rechargeable cells 7 has the same overall size as the battery of rechargeable cells 6.

The successive operations that the user must perform to go from operation with the battery of rechargeable cells 6 (cf FIG. 6) to operation with the non-rechargeable cells 7 (cf FIG. 8) are described below.

Figure 5:
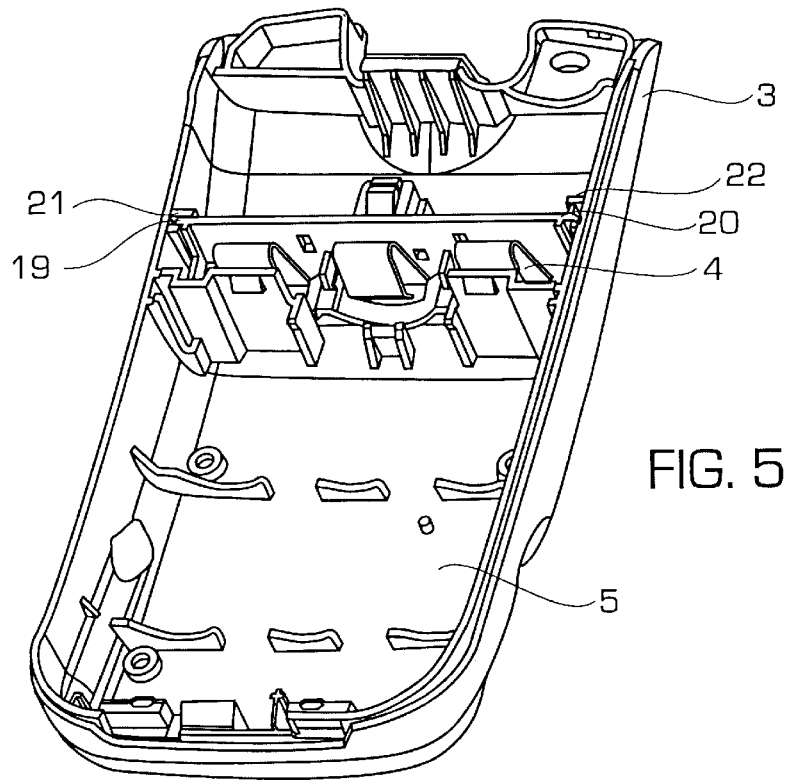
FIG. 5 shows the FIG. 2 power supply unit with the removable part in the passive position (as shown in FIG. 3)

Firstly the user removes the battery of rechargeable cells 6 from the cavity (cf FIG. 5). The removable part 4 is in the passive position (cf FIGS. 3 and 5). The user removes the removable part 4 from the cavity 5 (cf FIG. 2), turns said part over, and then puts it back in the cavity 5 (cf FIGS. 4 and 7). The removable part 4 is now in the active position. Finally, the user puts the non-rechargeable cells 7 in place in the cavity 5 (cf FIG. 8).

Optionally, when the removable part is in the passive position, the central contact blade $14_2$ constitutes means for mechanically holding the battery of rechargeable cells 6 inside the cavity 5 by pressing against said battery of rechargeable cells 6.

A description follows of a particular embodiment of the means for fixing the removable part 4 inside the cavity 5 in the passive position and in the active position. It should firstly be noted that the width of the removable part 4 is less than or equal to the width of the cavity 5 so that it can be placed transversely inside the cavity 5 both in the passive position (cf FIGS. 5 and 6) and also in the active position (FIGS. 7 and 8).

When the removable part 4 is placed in the passive position (cf FIGS. 5 and 6), the ends 19, 20 of the removable part 4 slide in a first pair of side grooves 21, 22 placed on either side of the cavity 5. In addition, the back of the cavity 5 is provided with first snap-fastening means 23 (cf FIG. 2) placed substantially midway between the two sides of the cavity 5 and serving to co-operate with second snap-fastening means 24 (visible in FIG. 4 only because they are situated underneath in FIG. 3) provided on the removable part 4 substantially in the center thereof.

When the removable part 4 is placed in the active position (cf FIGS. 7 and 8), the ends 20, 19 of the removable part 4 (which are interchanged relative to the passive position) slide in a second pair of side grooves 25, 26 placed on either side of the cavity 5. In addition, the back of the cavity 5 is provided with third snap-fastening means 27 (cf FIG. 2) placed substantially midway between the two sides of the cavity 5 and serving to co-operate with fourth snap-fastening means 28 (visible in FIG. 3 only because they are situated underneath in FIG. 4) provided on the removable part 4 substantially at the center thereof.

As shown clearly in FIG. 2, the second pair of side grooves 25, 26 and the third snap-fastening means 27 are slightly offset relative respectively to the first pair of side grooves 21, 22 and to the first snap-fastening means 23.

It should also be noted that, in this embodiment, the third snap-fastening means 27 are provided with the above-mentioned stud, making it possible for the central contact blade $14_2$ to come into contact with the conductive strip 15 when the removable part 4 is placed in the active position.

We claim:

1. A power supply unit for portable apparatus, the unit being of the type designed to be removably mounted on a body of said portable apparatus, said body being provided with a first power supply connector, said power supply unit being provided with a cavity that is suitable for receiving a battery of rechargeable cells or a set of at least one non-rechargeable cell;

said batter of rechargeable cells being provided with a second connector designed to cooperate with said first connector when said battery of rechargeable cells is placed in said cavity;

said power supply unit further including a removable part having a third connector designed to cooperate with said first connector;

wherein said removable part is moveable between two positions inside said cavity including:
   a passive position when the battery of rechargeable cells is placed in the cavity, in which position the part does not serve as an electrical interface relative to said first connector; and
   an active position when the set of at least one non-rechargeable cell is placed in the cavity, in which position the part serves as an electrical interface between said set of at least one non-rechargeable cell and said first connector by connection of said first connector with said third connector.

2. A power supply unit according to claim 1, wherein said set of at least one non-rechargeable cell has an overall size that is the same as the overall size of said battery of rechargeable cells.

3. A power supply unit according to claim 1, wherein said removable part is provided with mechanical holding means for holding said battery of rechargeable cells in said cavity when said part is in said passive position.

4. A power supply unit according to claim 3, wherein said mechanical holding means comprise at least one spring-forming blade that:
   presses against said battery of rechargeable cells when said removable part is in said passive position; and
   provides electrical contact with a pole of a non-rechargeable cell of said set when said removable part is in the active position.

5. A power supply unit according to claim 1, wherein said removable part has a width less than or equal to the width of said cavity;
   and wherein the wall of said cavity is provided with:
   a first pair of side grooves placed on either side of the cavity and in which the ends of said removable part can slide when said part is placed in said passive position; and
   first snap-fastening means placed substantially midway between the two sides of the cavity and serving, when said part is placed in said active position, to cooperate with second snap-fastening means provided on said removable part substantially at the center thereof.

6. A power supply unit according to claim 5, wherein the wall of said cavity is provided with:
   a second pair of side grooves placed on either side of the cavity, and in which the ends of said removable part can slide when said part is placed in said active position; and
   third snap-fastening means placed substantially midway between the two sides of the cavity, and serving, when said part is placed in said active position, to cooperate with fourth snap-fastening means provided on said removable part substantially at its center.

7. A power supply unit according to claim 6, said set comprising at least two non-rechargeable cells, wherein said third and fourth snap-fastening means also cooperate to provide an electrical link contributing to the electrical link between the non-rechargeable cells.

8. Portable apparatus, including a power supply unit according to claim 1.

9. Apparatus according to claim 8, constituted by a portable radiocommunications terminal.

* * * * *